US005117727A

United States Patent [19]

Matsuda

[11] Patent Number: 5,117,727

[45] Date of Patent: Jun. 2, 1992

[54] TONE PITCH CHANGING DEVICE FOR SELECTING AND STORING GROUPS OF PITCHES BASED ON THEIR TEMPERAMENT

[75] Inventor: Toshinori Matsuda, Sizuoka, Japan

[73] Assignee: Kawai Musical Inst. Mfg. Co., Ltd., Sizuoka, Japan

[21] Appl. No.: 456,942

[22] Filed: Dec. 26, 1989

[30] Foreign Application Priority Data

Dec. 27, 1988 [JP] Japan ........ 63-329998

[51] Int. Cl.[5] ........ G10H 7/00; G10H 5/00; H02M 5/00

[52] U.S. Cl. ........ 84/619; 84/657; 84/445; 84/451

[58] Field of Search ........ 84/442, 445, 451, 454, 84/455, 477 R, 478, 615, 619, 653, 657, 678, 685, DIG. 18

[56] References Cited

U.S. PATENT DOCUMENTS 4,238,985 12/1980 Adachi ........ 84/DIG. 9 X
4,503,745 3/1985 Clark et al. ........ 84/689
4,635,517 1/1987 Nagashima et al. ........ 84/619
4,724,736 2/1988 Isozaki ........ 84/445
4,796,509 1/1989 Mizuguchi et al. ........ 84/454
4,947,724 8/1990 Hirano et al. ........ 84/631
4,957,032 9/1990 Hirano et al. ........ 84/615

*Primary Examiner*—William M. Shoop, Jr.
*Assistant Examiner*—Jeffrey W. Donels

[57] ABSTRACT

A tone pitch changing device comprising an operation content memory for storing the contents of an operation required for generating a sound having a pitch which belongs to one of a group of pitches, a frequency interval between each pair of adjacent pitches of each group being different among the groups of pitches, a group selecting unit for selecting and indicating one of the groups of pitches, an operation content reading unit for reading the contents of an operation, required for generating a sound having a pitch of the group selected and indicated by the group selecting unit, from the operation content storing unit, an operating unit for performing an operation in accordance with the contents of the operation read from the operation content reading unit, an operation result memory for storing the result of the operation performed by the operating unit, a pitch indicating unit for indicating a pitch of the group, and an operation result reading unit for reading the result of the operation performed with respect to a pitch indicated by the pitch indicating unit.

14 Claims, 4 Drawing Sheets

FIG. 3

| PITCH | KEY CORD OCTAVE | KEY CORD NOTE |
|---|---|---|
| $C_0$ | 0 0 0 0 | 0 0 0 1 |
| $C_0^{\#}$ | 0 0 0 0 | 0 0 1 0 |
| $D_0$ | 0 0 0 0 | 0 0 1 1 |
| : | : | |
| : | : | |
| $B_0$ | 0 0 0 0 | 1 1 0 0 |
| $C_1$ | 0 0 0 1 | 0 0 0 1 |
| : | : | |
| : | : | |
| $B_1$ | 0 0 0 1 | 1 1 0 0 |
| $C_2$ | 0 0 1 0 | 0 0 0 1 |
| : | : | |
| : | : | |
| $B_2$ | 0 0 1 0 | 1 1 0 0 |
| $C_3$ | 0 0 1 1 | 0 0 0 1 |
| : | : | |
| : | : | |

FIG. 4

| PITCH NAME | EQUAL TEMPERAMENT | PYTHAGORAS TEMPERAMENT | PURE TEMPERAMENT |
|---|---|---|---|
| C | 0 | 0 | 0 |
| C# | 100 | 102 (+2) | 102 (+2) |
| D | 200 | 204 (+4) | 204 (+4) |
| D# | 300 | 306 (+6) | 295 (−5) |
| E | 400 | 408 (+8) | 386 (−14) |
| F | 500 | 498 (−2) | 498 (−2) |
| G | 600 | 600 (±0) | 600 (±0) |
| G# | 700 | 702 (+2) | 702 (+2) |
| A | 800 | 804 (+4) | 793 (−7) |
| A# | 900 | 906 (+6) | 884 (−16) |
| B | 1000 | 1008 (+8) | 986 (−14) |
| B# | 1100 | 1110 (+10) | 1088 (−12) |

TONE PITCH CHANGING DEVICE FOR SELECTING AND STORING GROUPS OF PITCHES BASED ON THEIR TEMPERAMENT

BACKGROUND OF THE INVENTION

1. Field of The Invention

This invention relates to an electronic musical instrument, and more particularly, to a tone pitch (hereunder referred to simply as a pitch) changing device for use in electronic musical instruments.

2. Description of the Related Art

Conventionally, an electronic musical instrument in which a temperament, such as an equal temperament can be selected from various tunes is provided with a pitch changing device having a memory which stores an operation expression for calculating data used to obtain desired pitches in the selected tune, or with an operational decoder for executing the operation expression. Namely, each time a pitch is indicated, the pitch changing device calculates the data corresponding to the indicated pitch, on the basis of the stored operation expression or a decoding program to be effected in the operational decoder, and outputs the thus calculated data.

Alternatively, there is known a conventional pitch changing device provided with a memory which stores precalculated data corresponding to all pitches to be selected or indicated, reads data therefrom corresponding to the indicated pitch and outputs the thus read-out data.

In the former conventional pitch changing device, however, which calculates data each time a pitch is indicated, a relatively long time is needed for the calculation and output of the data, and thus this device has a disadvantageous slow responsitivity.

The latter conventional pitch changing device, which precalculates and stores data of all of the pitches for each temperament, has a drawback in that it requires a very large memory capacity.

The present invention has been created in order to eliminate the above describe drawbacks of the conventional pitch changing devices.

SUMMARY OF THE INVENTION

Therefore, an object of the present invention is to provide a pitch changing device which requires a smaller memory capacity but has a faster responsitivity.

To achieve the foregoing object, in accordance with the present invention, there is provided a pitch changing device wherein, when one group of a plurality of groups of pitches is selected, an operation to be effected to obtain data required for generating sounds each having a pitch of the selected group is read from a memory, the read-out operation is then performed, and the result of the operation is prestored in a memory. Thereafter, the stored result of the operation is read from the memory each time a pitch of the selected group is indicated. Namely, only the operation corresponding to the selected group of pitches is selected, and only the result of selected operation is prestored in the device. Accordingly, when data corresponding to a pitch of the selected group is to be output, only the stored result of the selected operation need be read out, and thus the required memory capacity can be reduced, and the speed of the responsitivity of the device can be increased.

BRIEF DESCRIPTION OF THE DRAWINGS

Other features, objects and advantages of the present invention will become apparent from the following description of a preferred embodiment thereof with reference to the drawings, in which like reference characters designate like or corresponding parts, and in which:

FIG. 3 is a diagram showing the contents of a key cord KC; and FIG. 4 is a diagram showing the relationships among pitches of temperaments represented in terms of a Cent, i.e., at an interval equal to one-hundredth of a half-tone or semitone in the case of the twelve-note equal temperament scale.

DESCRIPTION OF THE PREFERRED EMBODIMENT

Hereinafter, a preferred embodiment of the present invention will be described with reference to the accompanying drawings.

Figure 1:
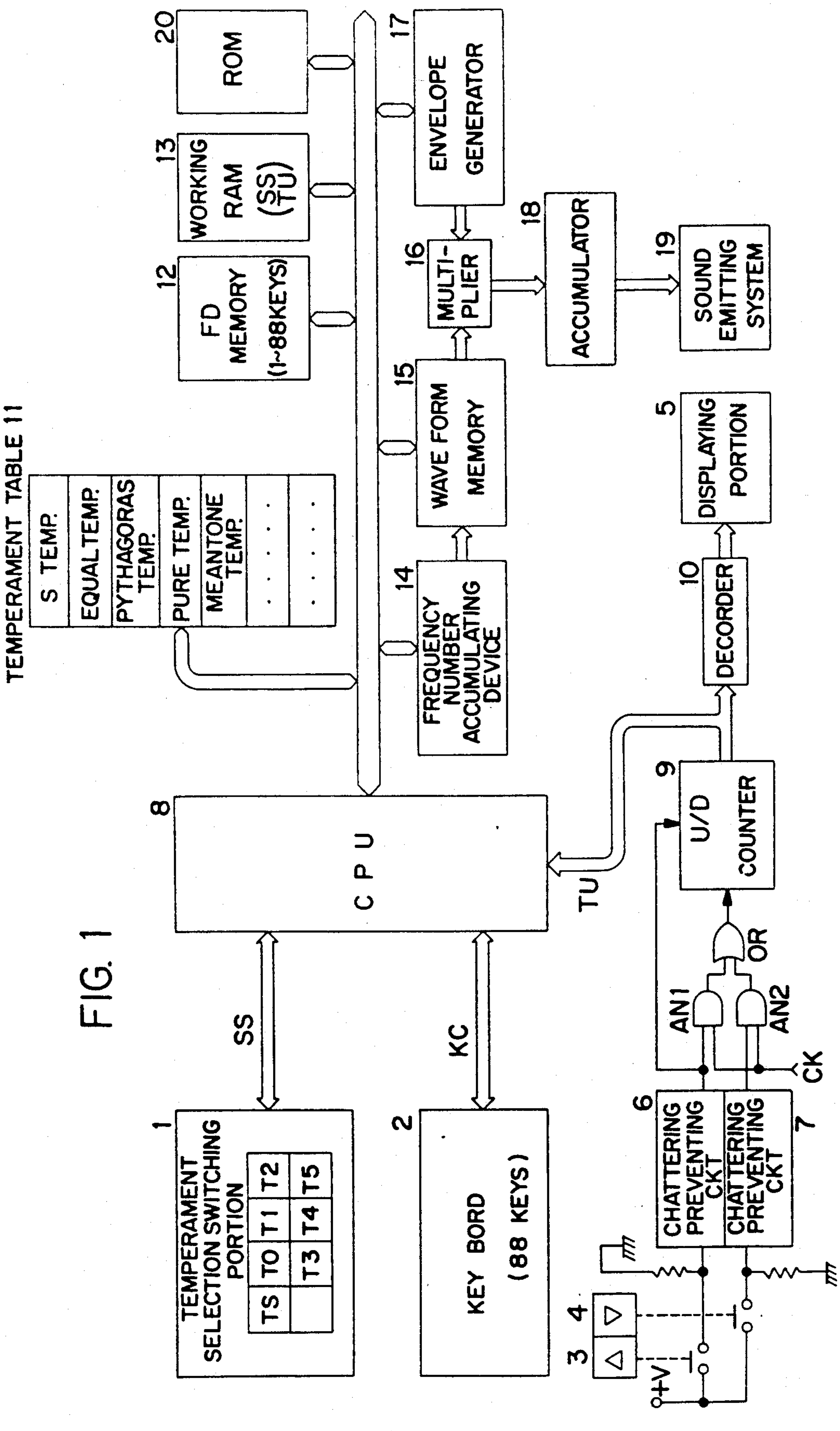
FIG. 1 is a schematic block diagram showing the overall construction of a pitch changing device embodying the present invention.

FIG. 1 is a schematic block diagram showing the overall construction of a pitch changing device embodying the present invention. In this figure, reference numeral 1 indicated a temperament selection switching portion provided with seven keys (hereunder also referred to as switches) T0, T1, . . . , T5 and TS. The key TO is used to select an equal temperament; T1, a Pythagoras temperament; T2, a pure temperament; T3, a meantone temperament; T4 and T5, other temperaments; and TS, a temperament usually used for the tuning of a piano, in such a manner that the frequency corresponding to a low pitch, which corresponds to a key of the piano, is set to be lower than that of a corresponding pitch of the equal temperament, and conversely, the frequency of a high pitch, which corresponds to a key of the piano, is set to be higher than that of a corresponding pitch of the equal temperament. Further, these temperaments are composed of pitches, having intervals there between which are not equal to each other.

Further, in this figure, reference numeral 2 indicated a keyboard provided with 88 keys, i.e., a number of keys corresponding to 7 octaves, and an additional 4 keys. Namely, this pitch changing device can indicate 88 pitches. Reference numerals 3 and 4 indicate tuning keys. These tuning keys 3 and 4 are an "up key" used for uniformly increasing the frequency corresponding to each pitch indicated by a corresponding key of the keyboard 2 by a constant amount or a constant rate thereof, and a "down key" used for uniformly decreasing the frequency corresponding to each pitch indicated by a corresponding key of the keyboard 2 by a constant amount or a constant rate thereof, respectively. A continuous operation of the tuning keys 3 and 4, increases or decreases a value of a pitch represented in terms of the Cent and displayed at a displaying portion 5 described later. Further, the signs "+" and "−", respectively indicating an increment of and a decrement in a frequency corresponding to a pitch, are also displayed at the displaying portion 5.

The operation of each switch or key of the temperament selecting switching portion 1, and of each key of the keyboard 2, is detected by a central processing unit (CPU) 8, by a scanning of the keys, which then generates temperament selecting data SS and key codes KC.

Further, a signal representing a high level (hereunder also referred to as a high level signal) is supplied through chattering preventing circuits 6 and 7 to AND gates AN1 and AN2, by turning on the tuning keys 3 and 4 so that the AND gates AN1 and AN2 are enabled. Furthermore, clock signals CK are input though the thus enabled AND gates AN1 and AN2 and an OR gate OR to a counter 9, and counted therein. In this case, the "up signal" from the chattering circuit 6 is input to a U/D terminal of the counter 9, and the operation of the counter is then changed to carry out an increment of the count. The data counted by the counter 9 is supplied to the CPU 8 as tuning data TU, and displayed at the display 5, through a decoder 10.

Figure 2:
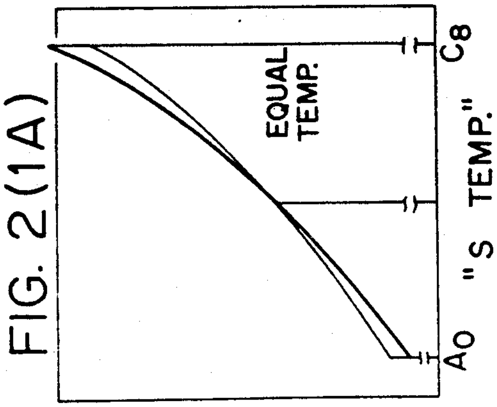
FIG. 2 (1A), (1B), (2A), (2B), (3A), (3B), (4A) and (4B) are graphs showing the contents of a temperament table.
Figure 2:
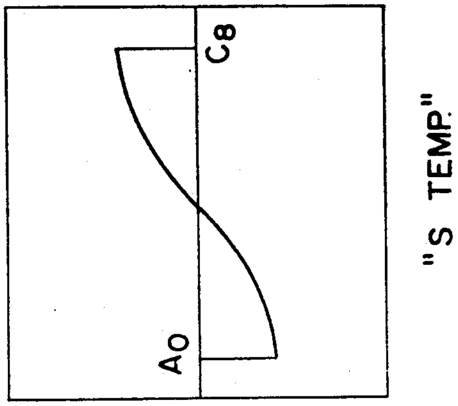
Figure 2:
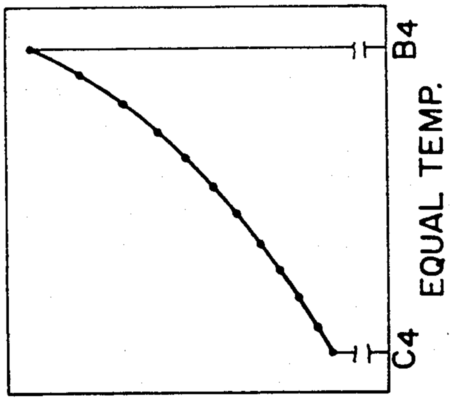
Figure 2:
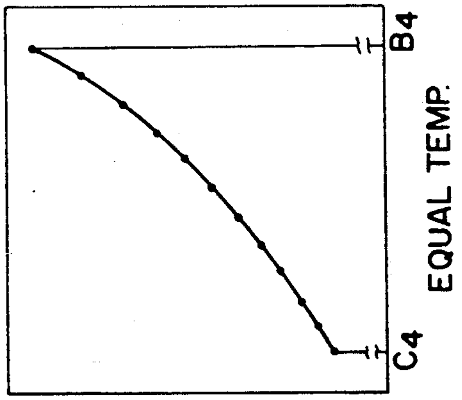
Figure 2:
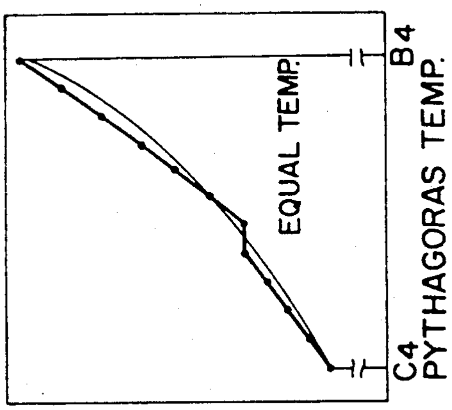
Figure 2:
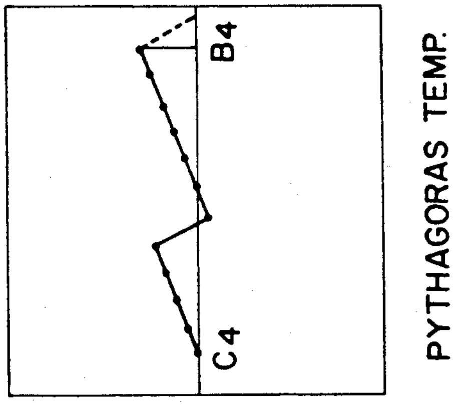
Figure 2:
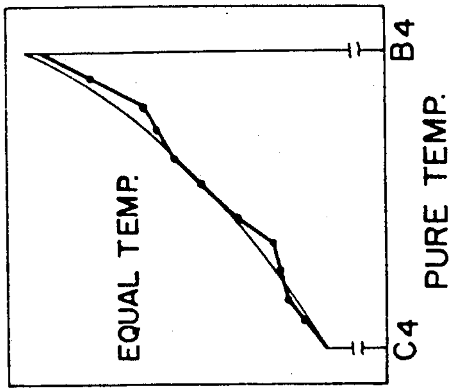
Figure 2:
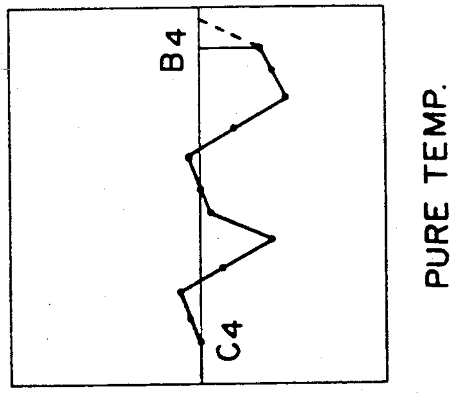

Also, a temperament table 11 is used to store the contents of operations to be performed to obtain data required for the generation of sounds having pitches of the above described temperaments. More specifically, the temperament table 11 stores data of the numbers representing frequencies (hereunder also referred to as frequency number data) FD, as shown in FIGS. 2 (2A), (3A), (4A) . . . , corresponding to key codes KC of keys (for example, keys $C_4$–$B_4$) of one octave, which are provided on the keyboard 2. The frequency number data FD of each of the above-described temperaments can be indicated by switches T0–T5, and TS of the temperament selection switching portion 1. The temperament table 11 is stored in a read-only memory (ROM).

Further, the frequency number data FD corresponding to the keys $C_4$–$B_4$, in the case of the temperament selected by one of the switches T0, T1, . . . , T5 and TS, is read by the CPU 8 and then written to and stored in an FD memory 12. This FD memory 12 has 88 areas, each area corresponding to one of the 88 keys of the keyboard 2, and all of the frequency number data FD corresponding to the 88 keys is present in these areas. At the same time, the frequency number data of each key other than the keys $C_4$–$B_4$ is obtained by multiplying the frequency of a pitch having a corresponding pitch designation $C_4$–$B_4$ by, for example, 2, 4, 8, . . . , or $\frac{1}{2}$, $\frac{1}{4}$, $\frac{1}{8}$, . . . . This process can be performed by the CPU 8. In the case of the temperament indicated by the switch TS of the temperament selection switching portion 1 (i.e., the temperament usually used in tuning a piano), however, not only the frequency number data FD of the pitches $C_4$–$B_4$ but also the data FD of pitches other than the pitches $C_4$–$B_4$ is stored in the temperament table 11, as shown in FIG. 2 (1A).

Next, the CPU 8 carries out an operation expressed by the following equation (1), on the tuning data TU Preset in the counter 9, by using the tuning keys 3 and 4, and the result $TU_t$ of the operation is written to "tuning areas" of a working random access memory (RAM) 13.

$$TU_t = 2^{TU/1200} \tag{1}$$

Note, the result $TU_t$ is equal to 1 where TU=0; to $2^{1/12}$ where TU=100; and to 2 where TU=1200, respectively, and thus indicate the rate of change in the frequency (hereunder referred to as a frequency changing rate) of the pitches, caused by the control of the tuning.

Thereafter, the CPU 8 modifies the values of the frequency number data FD in accordance with the control of the tuning, by multiplying the frequency number data FD of all of the 88 pitches or keys, which is stored in the FD memory 12, by the data of the frequency changing rate $TU_t$.

Note, the temperament selecting data SS selected by each of the switches T0–T5 and TS of the temperament selection switching portion 1 is also stored in the working RAM 13.

This modification of each frequency number FD is effected each time the tuning keys 3 and 4 are operated. Further, the prestorage of the frequency number data FD in the FD memory 12 in accordance with the contents of the temperament table 11 is effected each time the power is turned on or each time a switch of the temperament selection switching portion 1 is operated. As shown in FIG. 3, each of the key codes KC corresponding to keys or pitches is composed of octave date (OC) representing in what octave the key is, and note data (NT) representing the designation of a pitch. Address data indicating an address in the FD memory at which the data FD corresponding to the operated key of the keyboard 2 is stored, is obtained by first multiplying only the octave data by 12, adding the result of the multiplication to the note data, and then decrementing the result of the addition by one. The thus obtained address data is supplied to the FD memory, and the corresponding frequency number data FD then read therefrom.

Next, the frequency number data FD thus read is input to a frequency number accumulating device 14, in which the data FD is periodically accumulated in sequence at intervals obtained by inverting a master clock frequency. Then, an integer represented by using upper bits used for representing this accumulated value is supplied to a waveform memory 15, to store the waveform as data (hereunder also referred to as reading address data) AD indicating an address therein at which the corresponding waveform is stored. The waveforms of musical tones are repeatedly read from the waveform memory 15. The larger the frequency number data FD, the larger the step of accumulating the reading address data AD used for reading the waveform from the waveform memory 15. Therefore, the frequency of a signal having the thus read waveform is increased.

In this case, the frequency data FD is given by the following equation (2):

$$FD = (f_o \times f_s)/(f_o \times f_x) \tag{2}$$

where $f_x$ denotes the frequency of a signal having the waveform to be read from the waveform memory 15 at the time at which it is stored therein; $f_s$ denotes the frequency at which data of the waveform data 15 is sampled; $f_o$ denotes the frequency corresponding to an indicated pitch when outputting the waveform read therefrom; and $f_x$ denotes the master clock frequency when reading the waveform data therein.

The waveform data read from the waveform memory 15 is multiplied by corresponding envelope data from an envelope generator 17, by a multiplier 16, and then all waveform data of a channel period is accumulated in the accumulator 18. Thereafter, musical tones are generated by and output from a sound emitting system 19. Accordingly, data FD corresponding to pitches of only a single temperament selected and indicated by a user or operator of the electronic musical instrument is stored in the FD memory 12, and therefore, the need to store the frequency number data FD of pitches of temperaments other than that selected is eliminated, thereby reducing the memory capacity required for storing the data FD. Further, as described above, the data FD, which results from the operations for emitting sounds having the pitches of the indicated temperament, has been stored in the FD memory 12, and thus the pitch changing device need not recalculate the frequency number data FD in accordance with the contents of the temperament table 11 each time the keys of the keyboard 2 are operated. Accordingly, the responsitivity, of the device is increased.

Although a preferred embodiment of the present invention has been described above, it is understood that the present invention is not limited thereto, and that other modifications will be apparent to those skilled in the art without departing from the spirit of the invention. For example, the present invention can be applied to temperaments other than those described above, and can be realized with regard to scales other than a whole-tone scale (for example, a pentatonic scale and a heptachord). Further, the frequency number data FD of pitches of one octave to be stored in the temperament table 11 may be those of keys of an octave other than the octave composed of pitches $C_4$–$B_4$. Moreover, instead of storing the data FD of all 88 keys of the keyboard 2, in the case of each temperament, may be prestored in the table 11. Furthermore, the temperament table 11 need not store only the frequency number data FD, with regard only to the equal temperament, the data FD of pitches of one octave can be stored therein together with that of other temperaments, and only data (hereunder also referred to as difference data) of the difference of the frequency number data FD of each pitch of the latter temperaments from the data FD of corresponding pitch of the equal temperament, as shown in FIGS. 2 (2B), (3B), (4B), . . . . In such a case, to obtain the data FD of pitches of the latter temperaments, preferably the data FD of pitches of the equal temperament is read first, and then the difference data is added to or subtracted from the read data FD of the equal temperament (Note, even in such a case, with regard to the temperament usually used in tuning a piano (hereunder also referred to as an "S temperament"), the difference data of all 88 pitches thereof is stored therein as shown in FIG. 2 (1B)). Further, the frequency changing rate $TU_t$ may be obtained by the decoder. In addition, the conversion of the key code KC to the data at the address in the FD memory 12 may be performed by the decoder, and can be omitted if the key code is not divided into the octave data and the note data is made continuous without reference to the number of octaves. Furthermore, the contents stored in the temperament table 11 may be a program for performing the calculation of the following equations, for evaluating the frequency number data FD corresponding to the pitches of each temperament:

(a) Namely, with regard to the equal temperament, $$FD=2^F;$$

$$P=(OC)+(NT)\times 2048/12+(TU)\times 2048/1200 \quad (3);$$

(b) with regard to a Pythagoras temperament and a pure temperament, $$FD=2^P;$$

$$P=(OC)+\{(NTcn)+(TU)\}\times 2048/1200 \quad (4)$$

where (OC), (NT) and (TU) represent the value of the octave data, the value of the note data, and the value of the tuning data, respectively, and (NTcn) represents the value of data obtained by decoding the note data of the key code KC in accordance with the contents of the decoding operation shown in FIG. 4, which illustrates another example of the differences of pitches of each temperament from a pitch C represented in terms of the Cent. Each pitch may have a different value, as shown in FIG. 4. Furthermore, in the equations (3) and (4), a numerator "2048" of the term "2048/12" is a binary data "$2^{11}$" represented by using 11 bits and representing the quantity of data of one octave. Further, a smaller difference between each pair of adjacent pitches (i.e., a larger number of pitches within one octave) can be realized by using another numerator represented by using a larger number of bits (for example, "4096", "8192" and so on). In contrast, a larger difference between each pair of adjacent pitches (i.e., a smaller number of pitches within one octave) can be realized by using still another numerator represented by using a smaller number of bits (for example, "1024", "512", "256" and so forth). The denominator "12" of the term "2048/12" represents the number of pitches of one octave. Therefore, if the difference in the data FD of the key codes of each pair of adjacent pitches, which differ from each other by a halftone or semitone, is represented in terms of "$2^n$" (n is an integer), the term "2048/12" indicates the size of the exponent "n". Furthermore, in the term "2048/1200" in the equations (3) and (4), the numerator "2048" has the same meaning as described above. Further, the denominator "1200" represents the quantity of the tuning data of one octave. Namely, the term "2048/1200" indicates the difference in pitch per Cent of the tuning data. A program for effecting this processing is stored in the ROM 20.

In the operation effected by executing such a program, the frequency number data FD can be calculated in accordance with the above described equation (3) with regard only to the equal temperament, and that with respect to other temperaments, the differences in the frequency number FD between each of pitches thereof and a corresponding pitch of the equal temperament are calculated in accordance with the contents shown in FIG. 4. In such a case, with regard to the "S temperament", the difference data of all 88 pitches thereof is stored.

The scope of the present invention, therefore, is to be determined solely by the appended claims.

I claim:

1. A pitch changing device comprising:

conversion content generating means for generating a content of a conversion required for attaining a sound having a pitch which belongs to one of a plurality of groups of pitches, a frequency interval between each pair of adjacent pitches of each group being different among said plurality of groups of pitches;

group selecting means for selecting and indicating one group of said plurality of groups of pitches;

converting means for performing a conversion in accordance with the content of the conversion, which is required for generating a sound having a pitch and which belongs to the group selected and indicated by said group selecting means, from said conversion content generating means;

conversion result storing means for storing a result of the conversion performed by said converting means;

pitch indicating means for indicating a pitch which belongs to any one of the plurality of groups of pitches;

pitch determining means for determining a whether the pitch indicated by said pitch indicating means belongs to the group of pitches selected and indicated by said group selecting means;

conversion result reading means for reading the result of the conversion performed by said converting means for the pitch indicated by said pitch indicating means when the pitch indicated by said pitch indicating means belongs to the group selected and indicated by said group selecting means; and group selecting control means for controlling said group selecting means to select and indicate a group of pitches which contains the pitch indicated by said pitch indicating means when the pitch indicated by said pitch indicating means belong to a group other than the group selected and indicated by said group selecting means.

2. The pitch changing device of claim 1, further comprising:

change indicating means for indicating a uniform change of each pitch of said group selected and indicated by a constant quantity thereof; and operating result modifying means for modifying the result of the operation in accordance with the uniform change indicated by said change indicating means.

3. The pitch changing device of claim 1, wherein said selected and indicated group of pitches is an equal temperament.

4. The pitch changing device of claim 1, wherein said selected and indicated group of pitches is a pure temperament.

5. The pitch changing device of claim 1, wherein said selected and indicated group of pitches is a Pythagoras temperament.

6. The pitch changing device of claim 1, wherein said selected and indicated group of pitches is a meantone temperament.

7. The pitch changing device of claim 1, wherein said selected and indicated group of pitches is a temperament used for the tuning of a piano.

8. A pitch changing device comprising:

operation content storing means for storing a content of an operation required for attaining a sound having a pitch which belongs to one of a plurality of groups of pitches, a frequency interval between each pair of adjacent pitches of each group being different among said plurality of groups of pitches;

group selecting means for selecting and indicating one group of said plurality of groups of pitches;

operation content reading means for reading the content of the operation, which is required for generating a sound having a pitch of said group selected and indicated by said group selecting means, from said operation content storing means;

operating means for performing the operation in accordance with the contents of the operation read from said operation content reading means;

operation result storing means for storing the result of the operation performed by said operating means;

pitch indicating means for indicating a pitch which belongs to any one of the plurality of groups of pitches;

pitch determining means for determining whether the pitch indicated by said pitch indicating means belongs to the group of pitches selected and indicated by said group selecting means;

operation result means for reading the result of the operation performed by said operating means for the pitch indicated by said pitch indicating means when the pitch indicated by said pitch indicating means belongs to the group selected and indicated by said group selecting means; and group selecting control means for controlling said group selecting means to select and indicate a group of pitches which contains the pitch indicated by said pitch indicating means when the pitch indicated by said pitch indicating means belongs to a group other then the group selected and indicated by said group selecting means.

9. A tone pitch changing device as set forth in claim 8, further comprising:

a change indicating means for indicating a uniform change of each pitch of said group by a constant quantity thereof; and a operation result modifying means for modifying the result of the operation in accordance with the indication by said change indicating means.

10. A tone pitch changing device as set forth in claim 8, wherein said group of pitches is a equal temperament.

11. A tone pitch changing device as set forth in claim 8, wherein said group of pitches is a pure temperament.

12. A tone pitch changing device as set forth in claim 8, wherein said group of pitches is a Pythagoras temperament.

13. A tone pitch changing device as set forth in claim 8, wherein said group of pitches is a meantone temperament.

14. A tone pitch changing device as set forth in claim 8, wherein said group of pitches is a temperament used for the tuning of a piano.

* * * * *